United States Patent [19]
Crump

[11] 3,774,456
[45] Nov. 27, 1973

[54] APPARATUS FOR USE IN WHEEL COUNTERBALANCING

[75] Inventor: Brian Crump, Rotherham, England

[73] Assignee: GKN Transmissions Limited, Warwick, England

[22] Filed: Oct. 1, 1971

[21] Appl. No.: 185,794

[30] Foreign Application Priority Data
Oct. 3, 1970  Great Britain............... 47,102/70

[52] U.S. Cl. ............................................. 73/462
[51] Int. Cl. ........................................... G01m 1/22
[58] Field of Search ............................73/462–466

[56] References Cited
UNITED STATES PATENTS
3,076,342  2/1963  Hilgers................................. 73/462
3,037,403  6/1962  Hack et al. ....................... 73/462 X
3,017,773  1/1962  Lash et al. ........................... 73/462

*Primary Examiner*—James J. Gill
*Attorney*—Holman & Stern

[57] ABSTRACT

In wheel counterbalancing apparatus a wheel is mounted in a pair of spaced bearings for rotation about reference axis and sensor means are provided for sensing reaction forces at each of the bearings resulting from imbalance of the wheel. Means are provided for sensing when the wheel is at or approaching its maximum rotational speed and for transmitting a signal to hold information displayed by digital d1splay tubes in a displayed state and at the same time to brake the drive to the wheel.

7 Claims, 8 Drawing Figures

Fig. 7

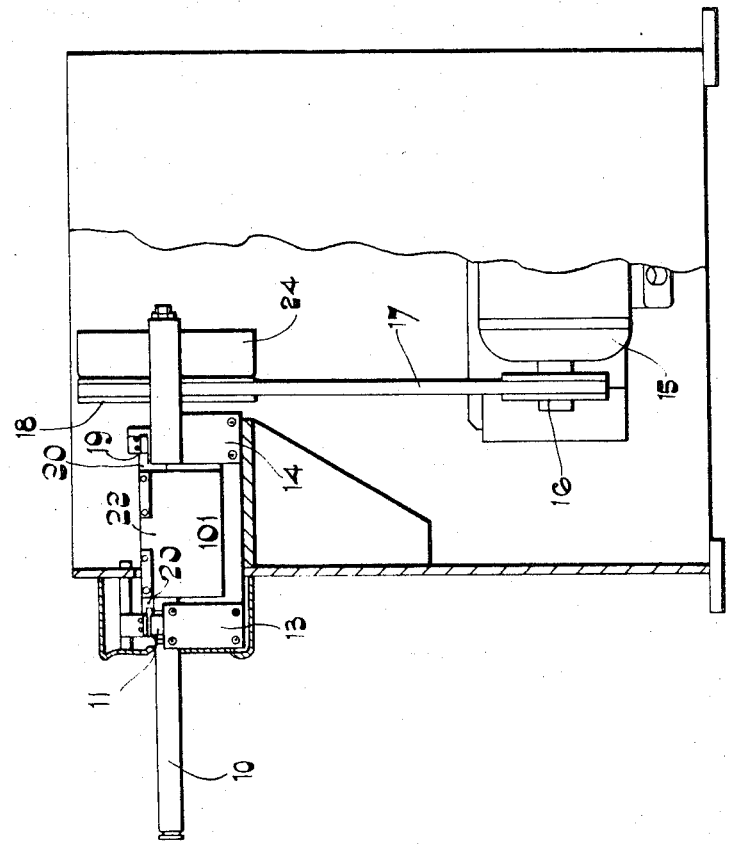
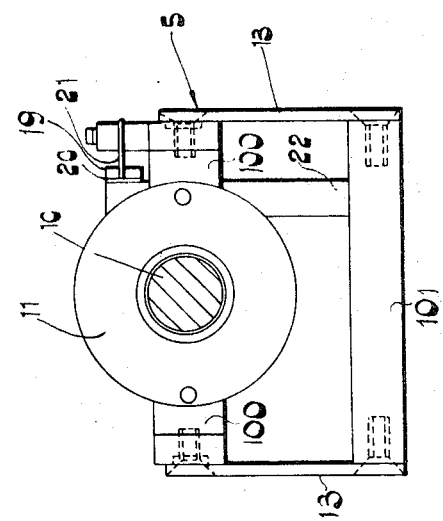
Fig. 2
Fig. 4

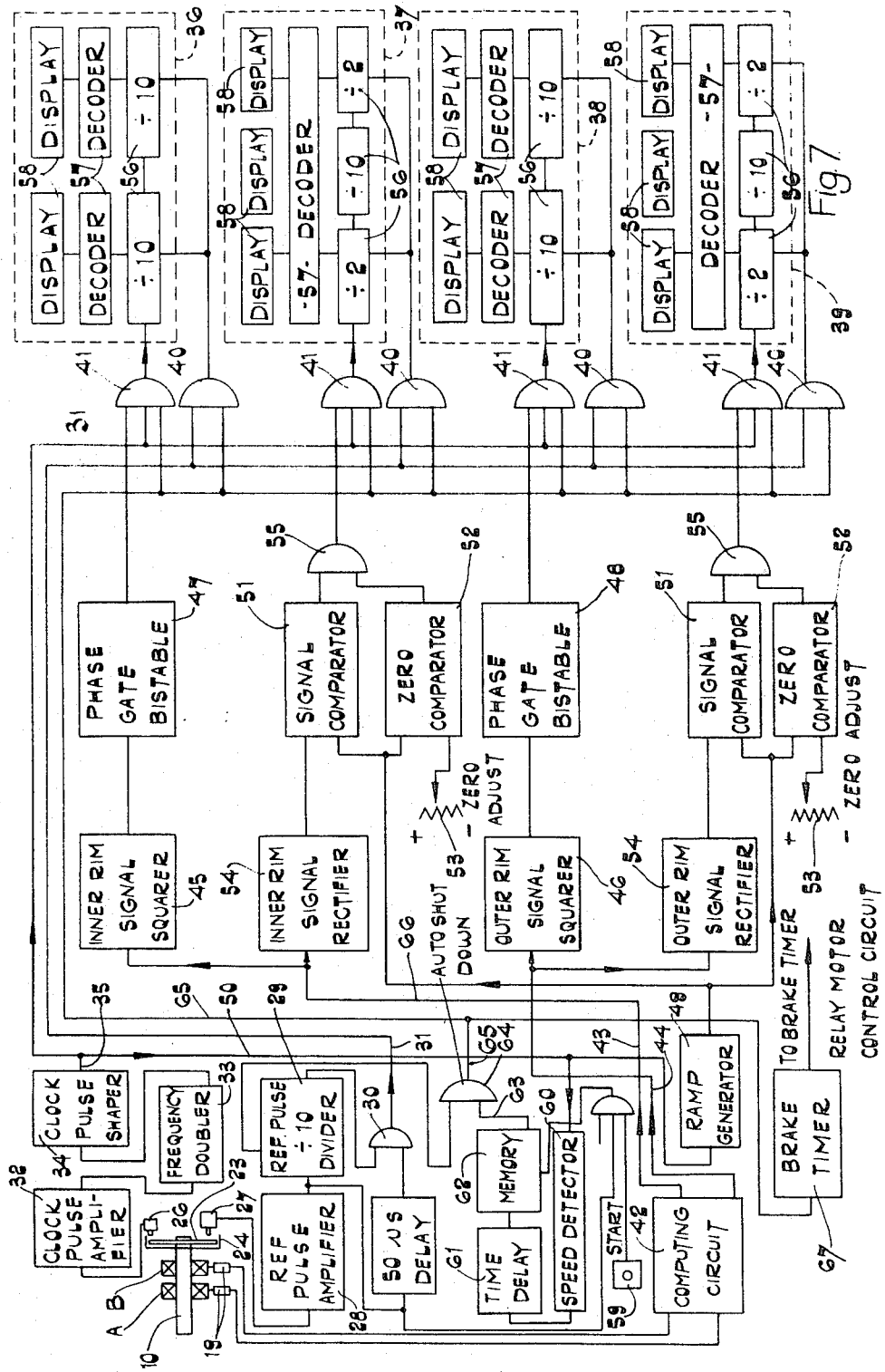

APPARATUS FOR USE IN WHEEL COUNTERBALANCING

BACKGROUND OF THE INVENTION

1. FIELD OF THE INVENTION

This invention relates to wheel counterbalancing apparatus which includes means for mounting the wheel for rotation about a reference axis and drive means for rotating the wheel, the mounting means including first and second spaced bearings and sensor means being provided for sensing, in use, reaction forces at each of said bearings resulting from imbalance of said wheel and for transmitting signals in dependence on the reaction forces so sensed.

2. DESCRIPTION OF THE PRIOR ART

In previous wheel counterbalancing apparatus means have been provided for translating the signals transmitted by the sensor means into information and displaying this information such as to indicate to an operator the values and positions of counter weights to be added to the wheel in a pair of spaced planes. It is an object of the present invention to provide means whereby, in use, a wheel counterbalancing test can be more speedily effected than with prevous such apparatus.

SUMMARY OF THE INVENTION

The wheel counterbalancing apparatus includes means for sensing the rotational speed of the wheel and producing an output signal when the wheel exceeds a predetermined speed, means responsive to the output signal to hold the information on the visual display means, and means responsive to the output signal to brake the wheel drive means.

BRIEF DESCRIPTION OF THE DRAWINGS

FIG. 2 is a sectional side view of the wheel balancing apparatus, FIG. 4 is a view of the mounting means taken along the line 4—4 of FIG. 3, FIG. 7 is a block diagram showing the electrical circuitry of the apparatus and, FIG. 8 is a diagram showing another part of the electrical circuit of the apparatus.

DESCRIPTION OF THE PREFERRED EMBODIMENT

Figure 1:
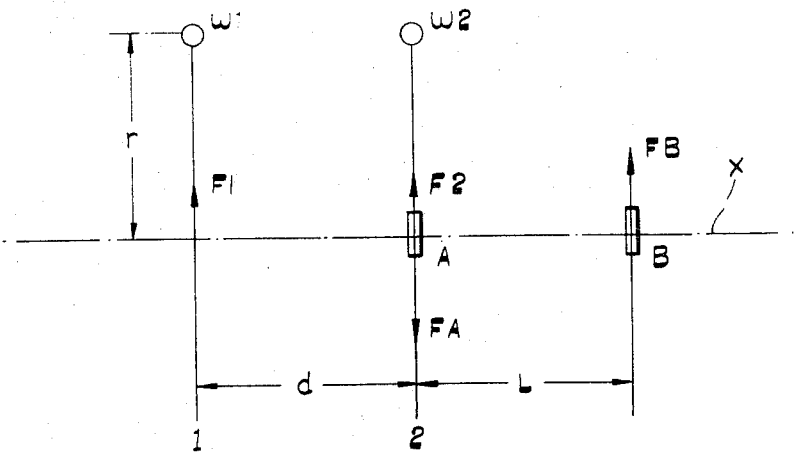
FIG. 1 is a diagrammatic representation of the forces acting on an unbalanced wheel.

The apparatus includes a shaft 10 which is free to rotate in a pair of spaced bearings A and B and which are self-aligning bearings contained in housings 11 and 12 respectively. The bearing housings 11 and 12 have arms such as 100 whereby they are mounted on vertical spring plates 13 and 14 secured to a base plate 101 and which allow the whole shaft assembly to deflect in a horizontal plane when subjected to out of balance forces produced by an unbalanced wheel. The distance between the bearings A and B is approximately 20 c.m. and the shaft 10 protrudes approximately the same distance beyond the front bearing A to enable the wheel to be mounted and positioned. The wheel is fixed to the shaft by a hub and positioned so that the plane of the inner rim of the wheel is in perpendicular alignment with the front bearing A, i.e. the plane of the inner rim of the wheel contains bearing A. The shaft 10 is arranged for rotation at a speed of up to 700 r.p.m. by a 1 horse-power 3 phase electric motor 15 which has a drive pulley 16 on which a belt 17 is entrained to transmit drive to a pulley 18 keyed to the shaft 10.

Vibrations of the shaft 10 caused by an unbalanced wheel are sensed by transducers comprising a pair of piezo-electric crystals 19 mounted on fibre-glass boards 20 and coupled to the bearing housings 11 and 12 by short lengths of steel wire 21 which are clamped in clamps 102 on the housings. The fibre-glass boards 20 are fixed onto a rigid pillar 22 secured to the base plate 101 so that movements of the bearing housings relative to the base plate produced bending strains in the boards 20 and hence coupled strains in the crystals 19. The crystals thus produce voltages across their terminals which are dependent on the vibrations at each of the bearing housings A and B. The transducers have sinusoidal output voltages the amplitudes of which depend on the magnitude of the required out of balance weight and the phase angles of which depend on the position of the required out of balance weight within the wheel. It is from these signals, i.e. sinusoidal output voltages, that the magnitude and position of the weights to be added to the outer and inner rims of the wheel under test are computed.

In operation, the operator sets the wheel size on a pair of controls (not shown) i.e. a wheel width control and a wheel radius control and initiates rotation of the wheel up to a balancing speed. While the machine is operating an electronic circuit, see FIGS. 6 and 7, continuously computes the displays in digital form the counterbalance weights to be added to the inner and outer rims of the wheel and their positions. The displayed values for each rim are updated during rotation of the wheel and, once the wheel is rotating at a predetermined speed, the displayed values are maintained and the wheel is brought to rest. The wheel is mounted so that one of the planes in which the counterbalance weights are to be added lies in the same plane as bearing A and as hereinafter explained the value and position of the counterbalance weight to be added in the plane remote from bearing A is proportional to the amplitude and phase angle of the voltage generated at bearing B and the value and position of the counterbalance weight to be added in the plane in line with bearing A is given by the amplitude and phase angles of the difference between the voltages generated at the two bearings.

In order to obtain the true value of the counterbalance weights to be added to the wheel, two constants for a wheel under test have to be taken into account. These are the rim width and the rim radius. A measuring device is therefore provided for determining these constants and the measuring device (not shown) may include a movable measuring stick for determining the rim radius, the value of the rim radius being read off on a scale marked on the measuring stick, and a pair of calipers for measuring the rim width. Before commencement of rotation of the wheel, information regarding these constants is fed into the electrical system of the apparatus by means of the appropriate controls (not shown) on a control panel.

If we now consider FIG. 1 of the drawings then the disturbing weight causing the out of balance of the rotating mass may be resolved into two components acting in a pair of spaced planes, namely plane 1 containing the outer rim of the wheel and plane 2 containing the inner rim of the wheel. Assuming weights $W_1$ and $W_2$ to be the resolved values of the out of balance weight acting in planes 1 and 2 respectively and effective at the wheel rim, i.e. at a distance r from the reference axis x, then if equal weights $W_A$ and $W_B$ are added each at a position diametrically opposite on each rim to the corresponding weight $W_1$ or $W_2$, the rotating mass will be statically and dynamically balanced. As described above bearing A lies in the same plane as the inner rim of the wheel, i.e., in plane 2.

In the following discussion of the mathematical principle of operation of the apparatus:

$W_A$ is the weight to be added in plane 1,
$W_B$ is the weight to be added in plane 2,
$W_1$ is the amplitude of the out of balance weight resolved into plane 1,
$W_2$ is the amplitude of the out of balance weight resolved into plane 2,
$\theta$ is the angular position of the out of balance weight resolved into plane 1 with respect to a reference position on the shaft,
$\phi$ is the angular position of the out of balance weight resolved into plane 2, with respect to the same reference position,
$F_A$ is the reaction force on bearing A due to the out of balance weight,
$F_B$ is the reaction force on bearing B due to the out of balance weight,
$F_1$ is the force in plane 1 due to the out of balance weight,
$F_2$ is the force in plane 2 due to the out of balance weight,
L is the distance between bearings A and B (constant),
r is the radius of the rim of the rotating mass,
d is the distance between the front and rear rims of the rotating mass,
w is the angular velocity of the rotating mass,
$V_A$ is the voltage output of transducer at bearing A,
$V_B$ is the voltage output of transducer at bearing B,
$V_1$ is a voltage proportional to out of balance weight in plane 1,
$V_2$ is a voltage proportional to out of balance weight in plane 2,
$K_T$ is the transducer constant, (volts per unit force)
$K$ is a constant $= K_T w^2/g$
$K_1$ is a constant $= Lg/K_T w^2 = L/K$ and
$K_2$ is a constant $= g/K_T w^2 = 1/K = K_1/L$
g is a constant being the acceleration due to gravity Taking moments about bearing B $$\dot{F}_1 (L + d) + \dot{F}_2 L = \dot{F}_A L \tag{1}$$

where $$\dot{F}_1 = (W_1 r/g) w^2 \; \angle\theta \tag{2}$$

and $$\dot{F}_2 = (W_2 r/g) w^2 \; \angle\phi \tag{3}$$

From 1

$$\dot{F}_2 = \dot{F}_A - \dot{F}_1 - \dot{F}_1 (d/L) \tag{4}$$

Taking moments about bearing A $$\dot{F}_1 d = \dot{F}_B L \tag{5}$$

From 5

$$\dot{F}_1 = \dot{F}_B (L/d) \tag{6}$$

Substituting 6 in 4

$$\dot{F}_2 = \dot{F}_A - (\dot{F}_B L/d) - \dot{F}_B \tag{7}$$

Multiplying (6) and (7) through by $K_T$ we have $$K_T \dot{F}_1 = K_T \dot{F}_B L/d \tag{8}$$

and $$K_T \dot{F}_2 = K_T \dot{F}_A - (K_T \dot{F}_B L/d) - K_T \dot{F}_B \tag{9}$$

But $$\dot{V}_1 = K_T \dot{F}_1 \tag{10}$$

$$\dot{V}_2 = K_T \dot{F}_2 \tag{11}$$

$$\dot{V}_A = K_T \dot{F}_A \tag{12}$$

and $$\dot{V}_B = K_T \dot{F}_B \tag{13}$$

Substituting 10 and 13 in 8 we have $$\dot{V}_1 = \dot{V}_B (L/d) \tag{14}$$

and substituting 11, 12 and 13 in 9 we have $$\dot{V}_2 - \dot{V}_A - \dot{V}_B (L/d) - \dot{V}_B \tag{15}$$

But $$\dot{F}_1 = (W_1/g) \, r \, w^2 \; \angle\theta \tag{16}$$

and $$\dot{F}_2 = (W_2/g) \, r \, w^2 \; \angle\phi \tag{17}$$

Substituting (16) and (17) in (10) and (11) respectively $$\dot{V}_1 = K_T(W_1/g) \, r \, w^2 \; \angle \theta \tag{18}$$

and $$\dot{V}_2 = K_T(W_2/g) \, r \, w^2 \; \angle \phi \tag{19}$$

Substituting K for $K_T \, W^2/g$ in 18 and 19 we have $$\dot{V}_1 = K \, W_1 r \; \angle \theta \tag{20}$$

$$\dot{V}_2 = K \, W_2 r \; \angle \phi \tag{21}$$

Thus transposing 20

$$W_1 \; \angle \theta = \dot{V}_1/rK \tag{22}$$

and substituting 14 in 22

$$W_1 \; \angle \theta = \dot{V}_B \, (L/dr \, K) \tag{23}$$

substituting $K_1$ for $L/K$ $$W_1 \; \angle \theta = \dot{V}_B \, K_1/r \, d \tag{24}$$

Transposing 21

$$W_2 \; \angle \phi = \dot{V}_2/rK \tag{25}$$

and substituting $K_2$ for $1/K$ $$W_2 \; \angle \phi = \dot{V}_2 \, K_2/r \tag{26}$$

and substituting 15 in 26

$$W_2 \; \angle \phi = (1/r) \, [\dot{V}_A \, K_2 - (\dot{V}_B \, K_1/d) - \dot{V}_B \, K_2] \tag{27}$$

Since the variables on the right hand side of expression 24 and 25 are vector quantities, the moduli of the expressions are proportional to the weights to be added at each rim, and, the phase angles represent respectively the positions at which the weights must be added to each rim.

Hence, weight to be added in plane 1 $W_A =$ $$W_1 = V_B \, K_1/rd \quad \text{(from 24)} \tag{28}$$

and in plane 2, $W_B =$ $$W_2 = (b/r) \, [V_A \, K_2 - (V_B \, K_1/d) - V_B \, K_2] \text{(from 27)} \tag{29}$$

The phase angles of the expressions 24 and 27 represent respectively the positions at which the weights must be added to each rim, $\angle \theta$ and $\angle \phi$.

Signals which are in the form of sinusoidal voltages from the transducers A and B mounted on the bearings are computed to obtain the expressions for the values and positions of the counterbalance weights as follows.

Figure 6:
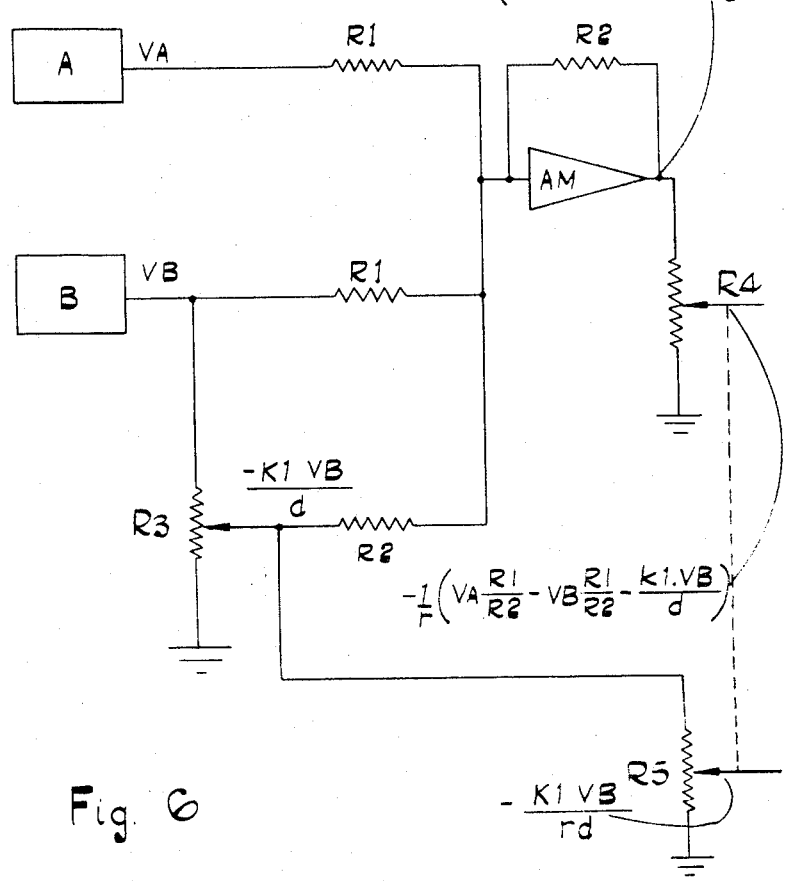
FIG. 6 is a circuit diagram showing part of the electrical circuitry of the apparatus.

As shown in FIG. 6 the sinusoidal output voltage $V_A$ from transducer A is added to the sinusoidal output voltage $V_B$ from transducer B in operational amplifier A M to which the transducers are connected in a circuit which includes a pair of resistance $R_1$ and a pair of resistances $R_2$. The values of the resistances $R_1$ and $R_2$ are chosen such that $K_2$ equals $R_1$ divded by $R_2$.

In addition a further voltage which is the output of transducer B modified by a first variable resistor $R_3$ by a factor proportional to the wheel width $(d)$ is added at the input of the operational amplifier A M. After modification by a second variable resistor $R_4$ by a factor proportional to the wheel radius $(r)$ the amplifier output voltage represents the weight and the position thereof to be added in plane 2. As shown in FIG. 6, compare expression 29 above.

The weight and the position thereof to be added in plane 1 is given by the voltage at the input of the wheel width control modified by a third variable resistor $R_5$ by a factor proportional to the wheel radius $(r)$ as shown in FIG. 6, compare expression 28 above. The modulus of each voltage represents the weight to be added in the respective plane and the phase angle of the voltage represents its position.

The first variable resistor $R_3$ referred to above is settable in dependence on the rim width as measured by said pair of unshown calipers whilst the second and third variable resistors $R_4$ and $R_5$ are settable in dependence on the rim radius as measured by said measuring stick. The voltage produced by the circuit of FIG. 6 are analogue signals which are subsequently fed to analogue to digital convertor circuits.

Figure 3:
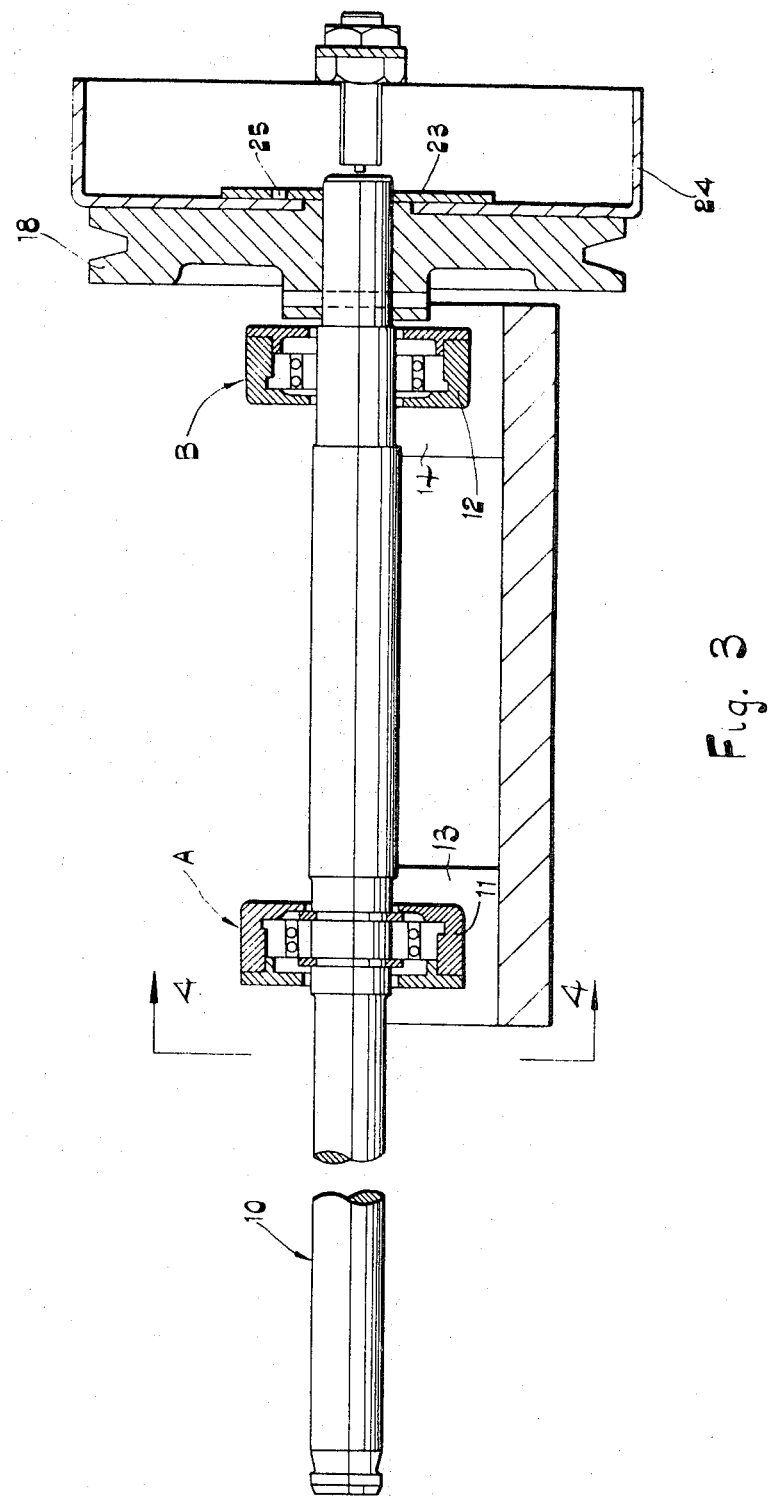
FIG. 3 is a sectional view showing the shaft on which a wheel to be counterbalanced is mounted.
Figure 5:
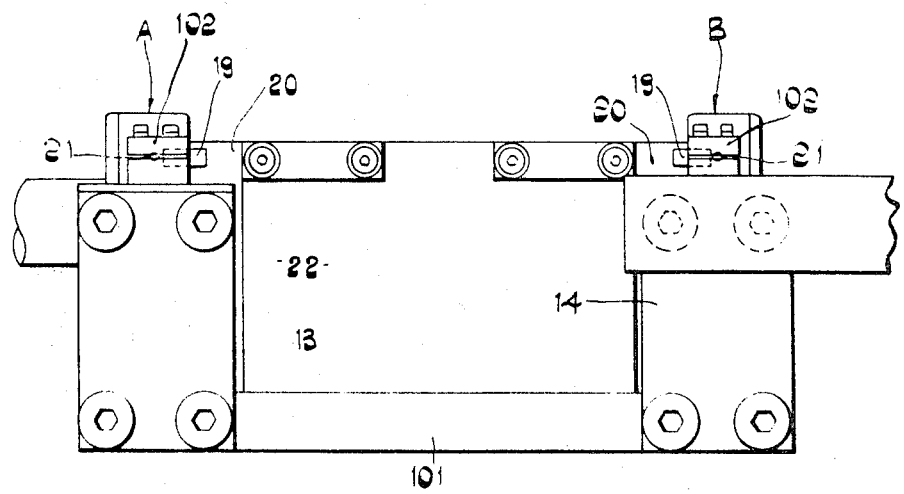
FIG. 5 is a view in the direction of the arrow 5 in FIG. 4.

A ferromagnetic disc 23 is secured to the end of the shaft 10 adjacent the pulley 18, see FIGS. 3 and 7, and is contained within a graudated drum 24 see FIGS. 2 and 3. The disc 23 has 36 notches cut into its periphery and has a small hole 25 drilled into it at a position approximately two thirds of the disc radius from the axis of the shaft 10. This disc 23 is used to generate clock pulses required by the digital counters of the apparatus and also referene pulses. The pulses are derived from two magnetic transudcers 26 and 27 each of which consists of a permanent magnet pole piece inside a coil. The transducers 26 and 27 ae mounted on a bracket (not shown), and together with the disc 23 constitute an impulse generator and arc positioned so that the tips of the pole pieces are in close proximity to the disc 23 and are respectively in line with the notches and the hole 25 formed in the disc. As the disc 23 rotates the changes in the air gap between the pole pieces and the disc 23 as a result of the notches and the hole generate voltage pulses in the coils of the transducers 26 and 27. The disc 23 and the transducer 26 generates 36 clock pulses per revolution of the shaft 10 and the disc 23 and the transducer 27 generate one reference pulse per revolution of the shaft 10. The single reference pulse generated during each revolution, is applied to an amplifier 28 and the readout circuits of the apparatus are arranged to be reset once every 10 revolutions during each period of the revolutions the phase and the amplitude of both signals are measured and the results stored and displayed until the next reset. To achieve the required frequency of the reference pulses their generated frequency is divided by 10 using a decade counter 29 (see FIG. 7) and a decoding gate 30 to obtain a reset pulse along a line 31 once every 10 revolutions of the shaft. The clock pulses from transducer 26 are passed to an amplifier 32 and then to a frequency doubler 33 in which the number of pulses per revolution of the shaft 10 is doubled to 72 pulses per revolution thus giving one pulse per 5° of angular rotation of the shaft 10. The pulses from the frequency doubler 33 pass to a pulse shaper 34 which improves the pulse shape and transmits the clock pulses along a line 35.

The reference pulse may be generated, as shown, from the same disc as the clock pulses by the hole 25, or from a second wheel or disc with a single tooth. The phase of the reference pulse is related to a fixed scale on the graduated drum 24 and the scale acts as a guide to enable the operator to mount the counterbalance weight on the wheel at the positions displayed.

The apparatus includes four counters and display mechanisms indicated generally by reference numerals 36, 37, 38 and 39 and each reset pulse transmitted along line 31 charges the state of bistable gates 40, there being one gate associated with each of the digital counters and each time a gate 40 is opened resets the counter to zero and sets it to receive clock pulses.

To find the position at which a counterbalance weight is to be attached the phase of the computed signals is measured relative to some fixed reference on the shaft. Counters 36 and 38 are used to indicate the angular position of the counter balance weights to be added in the two planes and pulses flow to counters 36 and 38 while the associated gate 41 is open, the gates being closed by the signal whose phase is being measured. The sinusoidal output from the computing circuit of FIG. 6 designated by reference numeral 42 in FIG. 7 is formed into a square waveform and phase gate bistable 47 operates on the positive going edge of the square 45 output, thus producing a square waveform in phase with that at the output of the squarer, but having half the frequency. This waveform is fed to logic gate 41 which allows clock pulses through while the waveform at the output of the phase gate bistable is positive. These clock pulses enter the counter provided it has been reset and enabled via logic gate 40. Thus a number of clock pulses are allowed to enter the counter during the period between the reset pulse enabling the counter and the output waveform of bistable 47 closing the logic gate at a point equivalent to the sinusoidal waveform passing through zero. Hence, the figure displayed by the angular position display represents the angular rotation of the shaft between the generation of the reference pulse and the sinusoidal computed waveform passing through zero.

Each counter 36 and 38 is a decimal counter and is arranged to display a number corresponding to the number of clock pulses it receives. The accumulated count which is smultaneously displayed on the digital display tubes of the phase counters 36 and 38 represents the angular rotation of the shaft as described and the count is then held until the next sample period, that is, until the next reset pulse occurs at which time the counter is reset to Zero on receipt of the reset pulse via gate 40 and the phase gate 41 is opened so that the counter can once more obtain a new sample. Since the clock pulses are generated along the line 35 by rotation of the shaft, each count of an angular rotation counter 36 or 38 represents an increment of angular rotation of the shaft irrespective of any speed variations which may occur. The required positions of both weights are physically related to the shaft when the apparatus stops using the graduated drum 24 fixed to the shaft 10.

The value of the weight required to be added in either plane is also displayed on digital tubes using counters similar to the angular position counters 36 and 38 but in this case it is the peak value of the computed signal which must be converted into a train of pulses and counted. The weight measuring circuit makes use of the ramp method of analogue to digital conversion using a staircase ramp. The staircase voltage ramp generator 49 is connected by a line 50 to line 35 to receive the clock pulses and on receipt of each clock pulse, the output voltage of the ramp generator 49 increases by 80 m.V. commencing at a voltage level of approximately 500 m.V. negative and rising in steps to approximately 5V positive.

To start the ramp, a reset pulse is fed via a circuit (not shown) to reset the output voltage of the ramp generator 49 to the 500 m.V. negative level. The clock pulses transmitted along lines 35 and 50 then step the ramp up to the 5 volt positive level at which the output voltage of the ramp generator is held until the next reset pulse occurs. The ramp output voltage is fed into two signal comparators 51 associated with the weight magnitude counters 37 and 39, there being a signal comparator 51 and a zero comparator 51 associated with each of said counters 37 and 39. In each zero comparator 52, the ramp output voltage is compared with a low dc voltage which can be adjusted from 1 volt negative to 1 volt positive by means of a potentiometer 53. The computed signal voltage obtained from the computing circuit 42 is rectified by a linear rectifier circuit 54 and then compared with the ramp voltage in the signal comparator 51. After the reset pulse occurs the ramp generator begins to step and when the output voltage of the ramp generator 49 exceeds the level set by the potentiometer 53, the output voltage of the zero comparator 52 changes from zero to 4 volts positive. This change in output voltage causes a logic gate 55 to open thus allowing gate 41 associated with the counter 37 or 39 to open allowing clock pulses to be fed along line 35 to the counter 37 or 39. The ramp output voltage continues to rise until it exceeds the level of the rectified signal voltage from rectifier 54 at which time the output of the signal comparator 51 changes state. This change of state of signal comparator 51 results in closing of the gate 41 of the counter 37 or 39 stopping the flow of clock pulses.

The accumulated count of the counter 37 or 39 then represents the value of the signal voltage amplitude and hence the weight of the required counterbalance. The full scale reading of each counter 37 or 39 is 200 grams and this is arranged to be read in units of 5 grams so that each count accumulated represents 5 grams. The counter is arranged to count up to 40 and is decoded to give a three digit read-out. The accumulated count is held and displayed until the next reset pulse when the counters 37 and 39 and the ramp generator 49 are reset, the counters being reset to zero and the reset pulse initiating the next sample.

Each counter 36, 37, 38 and 39 includes a number of resettable counting stages 56, one or more decoders 57 and a plurality of digital display tubes 58 the numbers displayed by which correspond to the states of the counting stages 56.

The apparatus as a whole is designed to be automatic in its operation insofar that, once the wheel is mounted on the shaft 10, and the width and diameter controls have been set, the operational cycle of the apparatus is initiated by a single push button 59 and is automatically stopped when the required measurements have been taken.

The start button 59 has a pair of contacts S1A and S1B. Operation of contact S1A on pressing the button 59 energises a contactor coil SC1 to close a holding contact SC1D and to close a contacts SC1A, SC1B and SC1C which are in the circuit of the motor 15. Operation of contact S1B removes the earth from the line between the button 59 (FIG. 7) and the start gate to allow resetting of the memory 62 by the first reference pulse.

The contact coil SC1 is in series with a contact TR1 controlled by a thermistor TR which forms part of a protection circuit which senses the temperature of the motor windings and opens the contact TR1 to prevent energisation of the contactor coil SC1 when the motor windings become overheated.

The contactor coil SC1 is in parallel with a further contactor coil SC2 controlled by a manually operable stop button which has a normally closed contact S2B and a normally open contact S2A. When the stop button is pressed, contact S2B is opened to de-energise contactor coil SC1 and closure of contact S2A results in energisation of contactor coil SC2 which closes a pair of contacts SC2A and SC2B. Closure of contacts SC2A and SC2B completes a circuit to a rectifier bridge RB from a step-down transformer SDT fed from the mains supply through a terminal block TB. The step down transformer SDT has a tapping for supplying a lamp LP which is lit to show that the apparatus is connected to the mains supply.

When the stop button is pressed the A.C. supply to the motor is interrupted through opening of contacts SC1A, SC1B and SC1C and D.C. is fed to the motor from the rectifier bridge RB to brake the motor.

Figure 8:
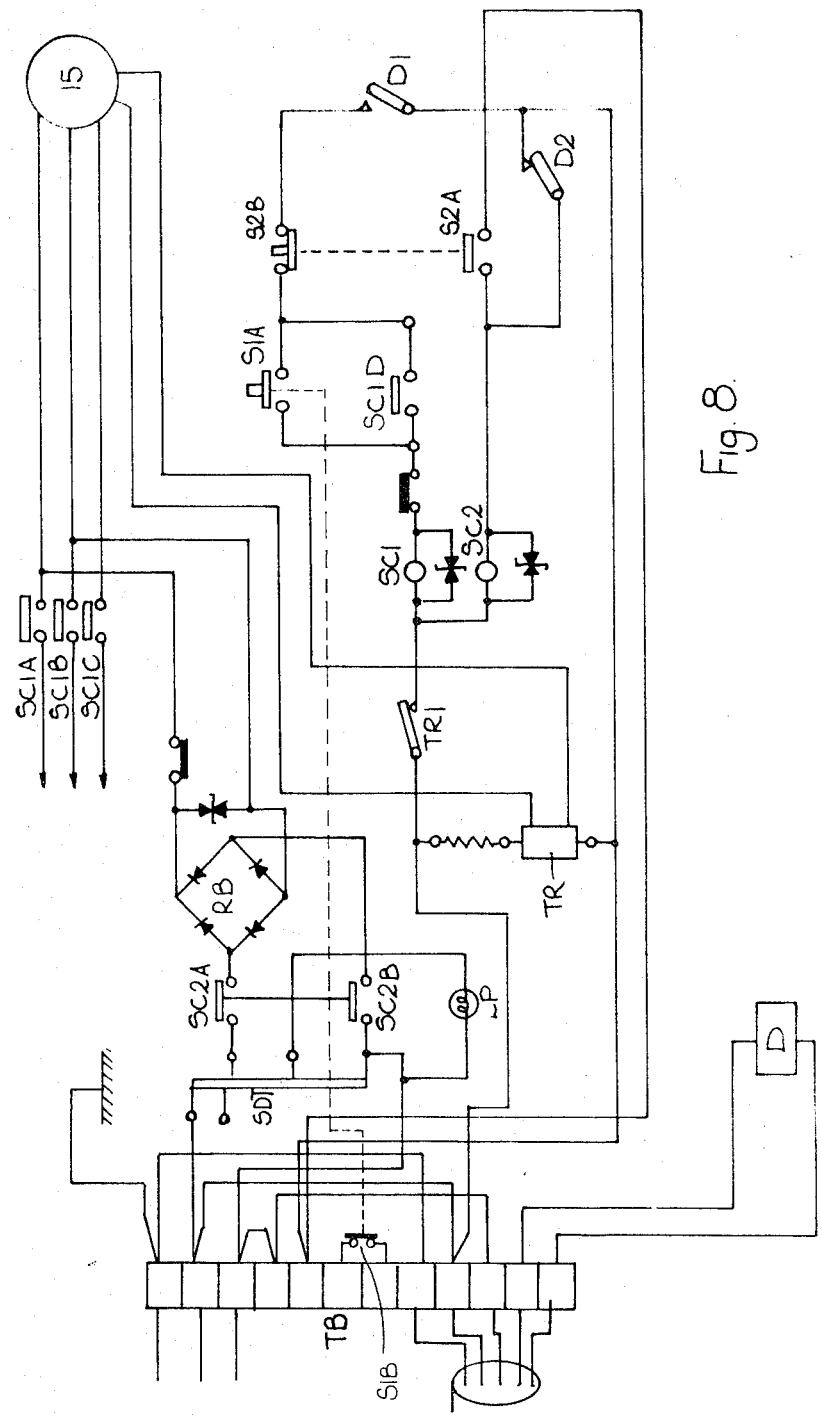

The circuit shown in FIG. 8 also includes a timer-controlled relay D which controls a pair of contacts D1 and D2, D1 being normally closed and D2 being normally open. When relay D is energised as hereinafter explained, contact D1 opens to de-energise contactor coil SC1 and contact D2 closes to energise contactor coil SC2.

The sequence of events which takes place during an operational cycle are as follows:

the machine is started by depression of the start push button 59 which operates the start contactor SC1 of the motor 15 as described above and enables the digital circuits to be initiated by the first reset pulse to occur as the shaft 10 begins to accelerate. The shaft assembly begins to vibrate and sampling takes place until an automatic shut-down procedure is initiated. As the wheel and shaft 10 approach their maximum speed a speed detector circuit 60 triggers a time delay 61 which is set so as to allow approximately 10 more samples to be taken before automatic shut-down occurs. The shut-down circuit includes a simple bistable memory 62 which is initiated at the end of the time delay period. A sample is taken every tenth revolution and providing the machine is on any revolution other than that on which the sample is being carried out, the machine is allowed to shut down. By feeding the memory output into a gate 64, together with a signal from the pulse divider 29 to determine that the machine is not on a sample revolution, a signal can be produced at the output of gate 64 to shut down the machine, provided that the above conditions are satisfied. The signal is fed along a line 65 to each of the gates 40 and 41 to close the gates so that the accumulated counts are held. At the same time, a signal is passed along a line 66 from gate 64 to a brake timer 67. The signal is fed along a line 65 to each of the gates 40 and 41 to close the gates so that the accumulated counts are held. At the same time a signal is passed along a line 66 from gate 64 to a brake timer indicated as 67 in FIG. 7.

The brake timer 67 includes relay D which is energised, to open contact $D_1$ so that, when the brake timer is initiated, the motor start contactor coil SC1 is de-energised and the supply of alternating current to the motor 15 is interrupted. The motor start contactor coil SC1 is interlocked with the stop contactor coil SC2 which then becomes energised via contact D2 of the brake timer relay D. This second contactor coil SC2 operates to give D.C. injection braking of the motor 15 as described above to bring the wheel and shaft to rest. After a predetermined time interval relay D is de-energised to close contact D1 and open contact D2.

The apparatus cannot be restarted until the brake timer has completed its timing period, ensuring that the largest wheel to be tested is brought to standstill and the DC braking current is removed from the motor. The digital information displayed by the tubes 58 will be held in a display state until a further testing procedure is started provided the power supply to the apparatus is not removed.

With the system described above the weight values and positions are displayed to an accuracy of plus or minus 2.5. grams for the weight values and plus or minus 2.5.° for the weight positions.

As can be seen from the above apparatus provides a simultaneous digital read-out of all the information required to balance a vehicle wheel and this information is stored on the digital displays until it is cancelled by the operator when he requires to balance a second wheel. Following the mounting of the wheel onto the machine, the time required to obtain the wheel balancing parameters is the time taken for the wheel to reach a constant speed of rotation, the speed detector 60 sensing a speed less than the maximum speed of rotation and the time, after the speed detector circuit initiates the time delay 61, taken for the wheel to be brought to rest.

The use of a toothed disc 23 to generate the clock pulses avoids the need for accurate speed control and stable frequency standards for analogue to digital conversion and the number of teeth on the disc determines the accuracy with which the counterbalancing parameters can be determined, the larger the number of teeth, the greater the accuracy with which the counterbalancing parameters can be determined.

In the arrangement shown in FIG. 7 there is a line extending from the clock pulse shaper 35 to the speed detector 60. The speed detector 60 includes a diode pump circuit for converting the pulses transmitted by the clock pulse shaper 35 to a direct voltage whose value depends on the frequency of the pulses. When this direct voltage exceeds a predetermined value, the time delay 61 is operated. The speed detector 60 may alternatively be arranged to receive pulses from the reference pulse amplifier 28. The direct voltage obtained by use of the diode pump circuit depends on the rate of rotation of the wheel and the predetermined value at which the time delay 61 is operated is set to correspond to a rate of rotation slightly less than the maximum rate of rotation of the wheel.

I claim:

1. In wheel counterbalancing apparatus which includes means for mounting the wheel for rotation about a reference axis and drive means for rotating the wheel, the mounting means including first and second spaced bearings and sensor means for sensing, in use, reaction forces at each of said bearings resulting from imbalance of said wheel and for transmitting signals in dependence on the reaction forces so sensed and means for translating said signals to information and means for visually displaying said information, the information being such as to indicate to an operator the values and positions of counter weights to be added to the wheel in a pair of spaced planes, the improvement which comprises means for sensing the rotational speed of the wheel and producing an output signal when the wheel exceeds a predetermined speed, means responsive to the output signal to hold the information on the visual display means, and means responsive to the output signal to brake the wheel drive means.

2. Apparatus according to claim 1 in which said sensing means includes means for generating a pulse on each rotation of the wheel, and means for converting the pulses into a direct voltage proportional to the frequency of the pulses.

3. Apparatus according to claim 2 in which means are provided whereby, when the direct voltage approaches a value corresponding to a wheel rotational speed which is almost the maximum wheel rotational speed, a trigger circuit is operated to produce said output signal.

4. Apparatus according to claim 1 which includes a manually operable element for energising a primary contactor to close switch means in the electrical circuit of a motor constituting said drive means to provide alternating current for driving the motor.

5. Apparatus according to claim 4 which includes a manually operable element for de-energising the primary contactor and for energising a secondary contactor which closes electrical switch means to provide direct current for braking the motor.

6. Apparatus according to claim 5 wherein said primary and secondary contactors are arranged in series with switch means controlled by a relay which is energised by said output signal a predetermined time interval after the wheel approaches its maximum rotational speed, energisation of this relay serving to de-energise the primary contactor and energise the secondary contactor.

7. Apparatus according to claim 6 wherein thermistor means are provided operable in the event that the windings of the motor should become overheated for preventing energisation of said primary contactor.

* * * * *